United States Patent [19]

Patel

[11] Patent Number: 5,502,030
[45] Date of Patent: Mar. 26, 1996

[54] LIQUID ADDITIVE COMPRISING A SULFONATED ASPHALT AND PROCESSES THEREFOR AND THEREWITH

[75] Inventor: Bharat B. Patel, Bartlesville, Okla.

[73] Assignee: Phillips Petroleum Company, Bartlesville, Okla.

[21] Appl. No.: 137,533

[22] Filed: Oct. 18, 1993

[51] Int. Cl.$^6$ ........................................ C09K 7/02
[52] U.S. Cl. ............................ 507/126; 507/120
[58] Field of Search ........................ 507/126, 120

[56] References Cited

U.S. PATENT DOCUMENTS

| | | | |
|---|---|---|---|
| 3,028,333 | 4/1962 | Stratton et al. | 507/126 |
| 3,215,628 | 11/1965 | Peacock | 507/126 |
| 3,264,214 | 8/1966 | Stratton | 507/126 |
| 3,525,688 | 8/1970 | Swanson | 252/8.5 |
| 3,639,233 | 2/1972 | Schultz et al. | 252/8.5 M |
| 3,709,819 | 1/1973 | Borwning et al. | 252/8.5 P |
| 3,723,311 | 3/1973 | Lummus | 507/126 |
| 3,882,029 | 5/1975 | Fischer et al. | 252/8.55 R |
| 4,425,241 | 1/1984 | Swanson | 252/8.5 C |
| 4,645,609 | 2/1987 | Patel | 507/126 |
| 4,719,021 | 1/1988 | Branch, III | 252/8.514 |
| 4,741,868 | 5/1988 | Rooney et al. | 260/505 R |
| 4,743,383 | 5/1988 | Stewart et al. | 507/126 |
| 4,830,765 | 5/1989 | Perricone et al. | 252/8.51 |
| 4,876,030 | 10/1989 | Dixon et al. | 507/126 |
| 5,030,365 | 7/1991 | Christensen et al. | 507/126 |
| 5,032,296 | 7/1991 | Patel | 507/126 |
| 5,089,538 | 2/1992 | Iizuka et al. | 523/132 |
| 5,091,448 | 2/1992 | Hostettler et al. | 524/45 |
| 5,114,597 | 5/1992 | Rayborn et al. | 507/126 |
| 5,114,598 | 5/1992 | Rayborn et al. | 507/126 |
| 5,120,708 | 6/1992 | Melear et al. | 507/126 |

*Primary Examiner*—Philip Tucker
*Attorney, Agent, or Firm*—Lucas K. Shay

[57] ABSTRACT

A process for preparing a fluid additive comprises (1) mixing a viscosifier such as a water-soluble polymer with water to form a viscosified water; (2) contacting a glycol-based polymer with the viscosified water followed by mixing to prepare a glycol-viscosified water mixture; and (3) contacting at least one sulfonated asphalt with the glycol-viscosified water mixture wherein the fluid additive comprises water, a viscosifier, a glycol-based polymer, and at least one sulfonated asphalt. Also disclosed is a process for using the fluid additive in drilling applications.

50 Claims, No Drawings

LIQUID ADDITIVE COMPRISING A SULFONATED ASPHALT AND PROCESSES THEREFOR AND THEREWITH

The present invention relates to a liquid composition comprising a sulfonated asphalt, a process for preparing the composition, and a process for using the composition.

BACKGROUND OF THE INVENTION

Water-based fluids such as, for example, drilling fluids, milling fluids, mining fluids, water-based metal working fluids, food additives and water-based paints, are useful in a variety of industrial applications. It is well known to those skilled in the art of drilling wells to tap subterranean deposits of natural resources, such as gas, geothermal steam or oil, especially when drilling by the rotary method or the percussion method wherein cuttings must be removed from the bore hole, it is necessary to use a drilling fluid.

The use of water-based fluids in, for example, workover and completion fluids in oil field operations is also well known to those skilled in the art. Workover fluids are those fluids used during remedial work in a drilled well. Such remedial work includes removing tubing, replacing a pump, cleaning out sand or other deposits, logging, etc. Workover also broadly includes steps used in preparing an existing well for secondary or tertiary recovery such as polymer addition, micellar flooding, steam injection, etc.

Completion fluids are those fluids used during drilling and during the steps of completion, or recompletion, of the well. Completion operation can include perforating the casing, setting the tubing and pump, etc. Both workover and completion fluids are used in part to control well pressure, to stop the well from blowing out while it is being completed or worked over, or to prevent the collapse of casing from over pressure.

Salts of sulfonated asphalt and their blends with materials such as, for example, gilsonite, blown asphalt, lignite, and mixtures thereof are commonly used as additives in drilling fluids. These additives, however, cause some foaming in water or water-based fluids. Furthermore, these additives are only partially soluble in the fluids. Their solubility in the fluids depends on factors such as salt content, solids content, pH, and combinations thereof. Therefore, a significant amount of the undissolved additives can be screened out with drilled solids by solid control equipment. This leads to problems, when using these additives in water-based drilling fluids, such as, for example, plugging of shale shaker screen, poor performance of the additives, and combinations thereof.

Liquid additives and processes therefore have been developed to overcome some of the problems associated with using dry additives. Processes have also been developed for formulating the liquid additives. For example, U.S. Pat. No. 5,114,597 discloses a process for manufacturing a water-based drilling fluid wherein the process comprises mixing a hydrophobic carbon black and either a surfactant or a dispersant followed by shearing the resulting mixture to convert the hydrophobic carbon black to hydrophilic carbon black. However, a usable liquid additive of neutralized asphalt sulfonate or a blend that contains neutralized asphalt sulfonate as a component cannot be prepared by the process disclosed in the '597 patent because the additive becomes too viscous or solids settle out at the bottom of the additive. Although U.S. Pat. No. 5,091,448 provides an excellent process for preparing a very stable liquid additive suspension, the liquid additive which contains a hydrocarbon as a liquid carrier cannot be used in some areas where environmental regulations are of concern. It is therefore highly desirable to develop a process that prepares a stable liquid additive suspension which is environmentally acceptable.

SUMMARY OF THE INVENTION

An object of the present invention is to provide a stable liquid additive useful in a water-based fluid. A further object of the invention is to provide a stable liquid additive useful over a wide range of temperatures. Another object is to provide a process for preparing a stable liquid additive. Other objects, advantages, and features will become more apparent as the invention is more fully disclosed hereinbelow.

According to a first embodiment of the invention, a liquid additive is provided which comprises water, a viscosifier, a glycol-based polymer, and at least one sulfonated asphalt.

According to a second embodiment of the invention, a process for preparing a stable liquid additive is provided which comprises (1) mixing a viscosifier with water to form a viscosified water; (2) contacting a glycol-based polymer with the viscosified water to prepare a glycol-viscosified water mixture; and (3) contacting at least one sulfonated asphalt with the glycol-viscosified water mixture.

DETAILED DESCRIPTION OF THE INVENTION

According to the first embodiment of the invention, a stable liquid additive is provided. The additive comprises water, a viscosifier, a glycol-based polymer such as, for example, polyethylene glycols, polypropylene glycols, and combinations thereof, and a sulfonated asphalt. The term "stable" is used herein to refer the liquid additive as, unless otherwise indicated, a suspension where substantially the majority of the insoluble solids remain suspended in tile liquid carrier and the liquid additive, after it has been stored at 40° F. to 100° F. for a period of more than 10 days, can flow out of the container without mixing or stirring.

The term "water" can be a pure water, a regular tap water, a solution, or a suspension wherein the solution or suspension contains dissolved, partially dissolved, or undissolved substances. The substances can be salts, clays, or combinations thereof.

Examples of salts that can be present in the composition of the invention include, but are not limited to, sodium chloride, potassium chloride, and mixtures thereof. Generally the total salts content in the composition can vary widely from 0% (water) to as high as 80 weight %. The typical total salts content can be in the range of from about 0.001 weight % to about 5 weight %.

Examples of suitable clays include but are not limited to kaolinite, halloysite, vermiculite, chlorite, attapulgite, smectite, montmorillonite, illire, saconite, sepiolite, palygorskite, Fuller's earth, and mixtures thereof. The presently preferred clay is montmorillonite clay. The presently most preferred clay is sodium montmorillonite, which is also known as bentonite. The clay can be present in the water in the range of from about 0.0025 weight % to about 15 weight %, preferably about 0.5 weight % to about 10 weight %, and most preferably 1 weight % to 5 weight %.

According to the first embodiment of the invention, the viscosifier can be any chemical that increases the viscosity of the water under ambient conditions. The presently preferred viscosifier is a water-soluble polymer.

The term "polymer" used herein denotes, unless otherwise indicated, a homopolymer, a copolymer, a terpolymer, or a tetrapolymer. Polymers suitable for use in the composition are those capable of further increasing the viscosity of the composition in aqueous form and include, but are not limited to, starches, gums, other biopolysaccharides, cellulose ethers, acrylamide-based polymers, and combinations of two or more thereof.

Examples of suitable cellulose ethers are those selected from the group consisting of carboxymethylcellulose, methylcellulose, carboxymethylhydroxyethylcellulose, hydroxypropylmethylcellulose, hydroxypropylcellulose, hydroxyethylcelulose, ethylhydroxycellulose, and combinations thereof.

Examples of suitable starches include those selected from the group consisting of carboxymethylstarch, hydroxyethylstarch, and hydroxypropylstarch.

Examples of suitable gums are those selected from the group consisting of arabic, trajacanth, karaya, shatti, locust bean, guar, psyllium seed, quince seed, agar, algin, carrageenin, furcellaran, pectin, gelatin, and combinations thereof.

Examples of suitable acrylic polymers are those selected from the group consisting of polyacrylic acid, polyacrylamide, acrylamide-acrylic acid, acrylamidemethacylic acid acrylonitrile, and combinations thereof.

Examples of suitable vinyl polymers are those selected from the group consisting of polyvinylpyrrolidone, polyvinyl alcohol, and carboxyvinyl polymers.

The biopolysaccharides useful in this invention are biopolymers produced by a process comprising the microbial transformation of a carbohydrate with a microorganism to obtain a polymeric material which differs from the parent polymeric material in respect of composition, properties and structure. These are thoroughly discussed in U.S. Pat. No. 5,091,448, which is incorporated herein by reference.

The presently preferred viscosifier is a high viscosity carboxymethylcellulose polymer.

The glycol-based polymer suitable for the present invention can be any organic polymer which contains glycol unit in the molecule such as, for example, a polyoxyalkene glycol or a monoether thereof. The presently preferred glycol-based polymers are polypropylene glycol, polyethylene glycol, or combinations thereof.

Polyethylene glycols and polypropylene glycols are commercially available glycol-based polymers. A polyethylene glycol is generally the product of an ethylene oxide polymerization whereas a polypropylene glycol is the product of a propylene oxide polymerization. Generally, a suitable polyethylene glycol or a polypropylene glycol can have a molecular weight in the range of from about 200 to about 10000, preferably about 1000 to about 8000, and most preferably 1200 to 6000. The glycol-based polymer can also be a block copolymer of polyethylenepoly-propylene glycol or a random copolymer of poly(ethylene-propylene) glycol. Furthermore, the glycol-base polymer useful in the invention can also contain a polyethylene glycol or a polypropylene glycol having one or more methyl groups attached to the ethylene or propylene units of the polymer.

Sulfonated asphalts are generally produced by reacting an asphaltic material which is first mixed with a solvent such as, for example, hexane followed by sulfonating the asphaltic material with a sulfonating agent such as, for example, sulfur trioxide. After the sulfonation process, the asphalt-sulfonic acid formed is neutralized with a basic compound such as, for example, sodium hydroxide followed by separation from the solvent. See U.S. Pat. No. 4,741,868, which is incorporated herein by reference. The presently preferred sulfonated asphalt is either a sodium salt or a potassium salt. Because the process for preparing a sulfonated asphalt is well known in the art, its preparation is omitted here for the interest of brevity.

The sulfonated asphalt used in the present invention can also be blended with another additive. Examples of suitable additives include, but are not limited to, gilsonite, graphite, carbon black, lignite, modified lignite such as neutralized lignite, sulfonated lignite and sulfoalkylated lignite, ground asphalt, blown asphalt, and combinations of two or more thereof. These additives are well-known to one skilled in the art of drilling applications. The weight ratio of this another additive to the sulfonated asphalt can be in the range of from about 0.001:1 to about 2:1, preferably from about 0.005:1 to about 1.5: 1, and most preferably from 0.01:1 to 1:1. These additives can be simply added to the sulfonated asphalt by a mixing means such as, for example, a mechanical blending, or they can be added separately to the liquid additive.

The weight percent of the individual component of the liquid additive can vary widely depending on the desired applications. Generally the liquid additive of the present invention can contain the viscosifier in the range of from about 0.01 to about 10, preferably from about 0.06 to about 5, and most preferably from 0.1 to 3 weight %; the glycol-based polymer is in the range of from about 0.05 to about 20, preferably from about 0.1 to about 15, and most preferably from 0.5 to 10 weight %; and the sulfonated asphalt in the range of from about 5 to about 60, preferably from about 10 to about 50, and most preferably from 15 to 45 weight %. Water makes up the rest of the additive composition.

The liquid additive composition can be made by a variety of mixing means. The individual components can be mixed in any order. However, it is preferred that the liquid additive be made by the process disclosed hereinbelow for the second embodiment of the invention.

According to the second embodiment of the invention, a viscosifier is first mixed with water to form a viscosified water. The glycol-based polymer is then added to the viscosified water followed by mixing to prepare a glycol-viscosified water. A sulfonated asphalt is added to the glycol-viscosified water followed by mixing to prepare the liquid suspension of the invention. The mixing in the above-described process can be carried out by any mixing methods known in the art such as, for example, a mechanical mixing.

The process of the invention can be carried out in a wide temperature range, generally in the range of from about 5° to about 80° C., preferably from about 10° to about 70° C., and most preferably from 15° to 60° C. The process can also be carried out under a wide pressure range, generally in the range of from about 0.5 to about 5 atmosphere (atm), preferably from about 1 to about 3 atm, and most preferably under atmospheric pressure. It generally takes about 15 minutes to about 24 hours to complete the process. The process time required generally depends on mixing equipment employed.

The liquid additive composition can be used in well treating, drilling, workover, or completion fluids in oil field operations by those skilled in the art. Generally, the liquid additive composition can be used in any drilled wells having a temperature in the range of from about 75° F. to about 600° F., preferably 80° F. to 500° F.

The following specific examples are intended to illustrate the advantages of the present invention and are not intended to unduly limit the scope of the invention.

EXAMPLE I

This example illustrates that a liquid composition sodium asphalt sulfonate prepared according to the process disclosed in U.S. Pat. No. 5,114,597 is not stable. The run was carried out as follows:

Sodium asphalt sulfonate produced at the Phillips Petroleum Company's plant in Conroe, Texas was screened. The material that passed through a U.S.A. Standard Testing Sieve No. 20 (A.S.T.M.E.-11 Specification, 0.0331 inches opening) and referred herein as "Na-AS" was used in the following run:

One hundred forty grams of Polyglycol P-4000 (obtained from Dow Chemical Corporation) were added to a pint canning jar. While stirring this sample with a Hamilton Beach Malt Mixer at a slow speed (around 3000 rpm), 60 grams of Na-AS were added in about one minute to prepare a liquid mixture. This liquid mixture was stirred at a high speed (around 15,000 rpm) for 10 minutes and then kept covered at about 85° F. for 20 hours. Almost complete settling of Na-AS was observed in this liquid mixture. Therefore, the mixture was stirred with the same high speed for 30 more minutes and then kept covered again at about 85° F. In less than 24 hours, almost complete settling of Na-AS was observed again. When the jar was opened and turned over to check if the liquid mixture flowed out of the jar without any stirring, only the liquid portion flowed leaving almost all of the settled Na-AS in the jar. These results show that the liquid mixture containing sodium asphalt sulfonate, prepared according to the process disclosed in the '597 patent, was not stable as defined hereinabove.

Example II

This example illustrates that the liquid additive, made according to the process disclosed in this invention, remains "stable". The runs were carried out as follows:

Run #1: One hundred forty milliliters of tap water were added to a pint canning jar. While stirring this water sample with a Hamilton Beach Malt Mixer at a slow speed (around 3000 rpm), 60 grams of Na-AS were added to the jar in about one minute. This liquid mixture was stirred at a very high speed (around 15,000 rpm). Heavy foaming occurred in less than one minute and liquid started running over. This result demonstrates that a liquid composition containing a sulfonated asphalt cannot be prepared by simply mixing the material and water at a very high speed.

Run #2: The procedure described in Run #1 was carried out except that, as soon as the foaming occurred, the stirring was stopped. Octyl alcohol (2 ml) was immediately added to the container to contain the foam. Stirring was then resumed as almost all of the foam disappeared, but the foam reappeared immediately upon stirring. Further addition of 2.5 ml more octyl alcohol followed by stirring did not prepare a liquid composition without a foam problem. This run demonstrates that octyl alcohol defoamed the water-sulfonated asphalt mixture only temporarily and a liquid composition containing an asphalt sulfonate cannot be prepared by simply mixing the material with water and using octyl alcohol as a defoamer.

Run #3: The procedure described in Run #1 was carried out except that as soon as the foaming occurred, the stirring was stopped. Polyglycol P-4000 (2.5 g, a polypropylene glycol obtained from Dow Chemical Corporation) was immediately added to the container to contain foam. The foam disappeared upon addition of polypropylene glycol. The stirring was resumed for an additional 10 minutes at the high speed. The foaming did not reappear. After the stirring, the sample was covered and kept at about 85° F. After two hours, most insoluble solids settled out. This run shows that a polypropylene glycol defoamed the asphalt/water mixture, but a stable liquid composition containing a sulfonated asphalt cannot be prepared by simply mixing the material with water and using a polypropylene glycol as a defoamer.

Run #4: One hundred forty milliliters of tap water were added to a pint canning jar. While stirring at the slow speed (Run #1), 0.8 gram of Drispac Regular (a high viscosity polyanionic cellulose polymer being marketed by Drilling Specialties, Inc., Bartlesville, Okla.) was slowly added to the water in about 30 seconds. After stirring for an additional 10 minutes with the high speed (Run #1) to form a viscosified water, 30 grams of Na-AS were added to the viscosified water in one minute while stirring with the slow speed. Upon completion of addition of the Na-AS, the mixture was stirred again with the high speed for 10 minutes. The sample volume almost doubled due to the foaming problem. This run indicates that, due to the foaming generation, a liquid composition containing a sulfonated asphalt cannot be prepared by simply mixing the material with water that has been viscosified with a polymer.

Run #5: One hundred thirty five milliliters of tap water was added to a pint canning jar. While stirring this sample at the slow speed (Run #1), 0.8 gram of Drispac Regular (see Run #4) was added in about 30 seconds. After stirring 10 minutes with the high speed (Run #1) to form a viscosified water, 5 grams of Polyglycol P-4000 (Run #3) were added to the viscosified water followed by addition of 30 grams of Na-AS in about one minute while stirring with the slow speed. The mixture was stirred for 10 more minutes with the high speed. No significant amount of foaming occurred (less than 5% volume increase). The sample was then covered and kept at about 85° F. After keeping for about 20 hours, it was stirred for 30 seconds with the high speed, and then kept covered at around 85° F. This sample remained stable as defined hereinabove. This run demonstrates that a liquid composition containing a sulfonated asphalt prepared by the invention process is stable.

Run #6: The procedure described in Run #5 was carried out except that 60 grams of Na-AS were used. The liquid composition thus prepared also remained stable.

Run #7: Two hundred seventy milliliters of tap water were added to a stainless steel cylinder (8.5 cm in diameter and 10.0 cm in height). While stirring at the slow speed (Run #1), 1.6 grams of Drispac Regular (see Run #4) were slowly added in about 30 seconds to the water followed by addition of 10 grams of Polyglycol P-4000 (see Run #3) in about one minute to prepare a glycol-viscosified water mixture. After 120 grams of Na-AS was added to the glycol-water mixture in about two minutes, the Na-As-containing mixture was immediately stirred for four minutes at a very high speed with a Ross mixer (made by Charles Ross & Son Company, Model No. ME 100L). The resulting mixture was transferred into a pint jar. The jar was kept covered at about 85° F. After about two hours, this liquid additive was stirred with the slow speed and then kept covered at about 85° F. This liquid additive thus prepared also remained stable. This run shows that the processing time can be reduced by using the Ross mixer at a higher speed.

EXAMPLE III

This example illustrates that the liquid additive, containing a mixture of sodium asphalt sulfonate and sodium lignite, made according to the process disclosed in this invention, also remains stable. The runs were carried out as follows:

Run #8: An aliquot of tap water (135 ml) was added to a pint canning jar. While stirring at the slow speed (Run #1), 0.8 grams of Drispac Regular (see Run #4) was slowly added to the water in about 30 seconds. After stirring 10 minutes at the high speed (Run #1) to form a viscosified water, 5 grams of Polyglycol P-4000 (see Run #3) were added to the viscosified water to form a glycol-viscosified water mixture. Then, 60 grams of a mixture containing 85 weight percent Na-AS and 15 weight percent Na-lignite were added to the glycol-viscosified water mixture in about one minute while stirring at the slow speed. The Na-As and Na-lignite-containing glycol-viscosified water mixture was stirred for 10 more minutes at the high speed. No significant amount of foaming occurred (less than 5% volume increase), so the sample was covered and kept at around 85° F. After about two hours, this liquid additive was stirred for 30 seconds at the slow speed and then kept covered at around 85° F. This sample was stable as defined above. This run demonstrates that a stable liquid composition containing a mixture of a sulfonated asphalt and a lignite can be prepared by the invention process.

Run #9: The procedure described in Run #8 was carried out except that 4 grams of Texos PPG-400 (a polypropylene glycol obtained from Texaco Chemical Company) and 1 gram of Polyglycol P-4000 (see Run #3) were used to replace the 5 grams of P-4000 used in Run #8. The liquid composition thus prepared was also stable. This run indicates that a combination of glycol polymers can be used to prepare a stable liquid composition containing a sulfonated asphalt.

Run #10: An aliquot of tap water (525 ml) was added to a 1000 ml cylinder (diameter in the range of 4 to 5 inches). While stirring with a Ross mixer (Run #7) at a low speed, 1.8 grams of Drispac Regular (see Run #4) were added to the water in about one minute, followed by addition of 15 grams of PPGD-4000 (Polyether Polyol from Olin Chemicals) and 360 grams of a mixture wherein this mixture contained about 85 weight percent sodium asphalt sulfonate and 15 weight percent sodium lignite to prepare a liquid composition containing glycol and a sulfonated asphalt. This liquid composition was then stirred at a very high speed with the Ross mixer for about 5 minutes. After the mixing, this composition was transferred into a quart jar. The jar was covered and kept at about 77° F. and was undisturbed for more than several months. Almost all insoluble solids remained suspended in the composition and, when the jar was opened up and turned over more than 95% of the liquid flowed out of the jar. This run demonstrates that a stable liquid additive can be made by the invention process.

EXAMPLE IV

This example illustrates that the liquid additive, made according to the process disclosed in this application, performs better than the dry additive in water based fluids.

A liquid additive was prepared by the process similar to the process described in Run #4 using 62 ml of tap water, 0.35 gram of Drispac Regular (see Run #4), 8 grams of PPGD-4000 (see Run #10), and 30 grams of Dry Additive (Dry Additive= Dry blend of around 85 weight percent sodium asphalt sulfonate and 15 weight percent sodium lignite). After keeping this liquid additive in a closed container at temperatures ranging from 70° F. to 120° F. for about 4 days, it was stirred for about 1 minute and the following tests were performed:

A bentonire suspension was prepared by mixing 10 grams of bentonire per 350 ml of -tap water with a Multi-Mixer (at around 11,000 rpm) for 10 minutes. The suspension was filtered through a 200 mesh screen. To 120 ml of the screened suspension in quart jars, the test materials (the liquid additive prepared above and Dry Additive) were added and the samples were stirred for 10 minutes with the Multi-Mixer at around 11,000 rpm. The samples were transferred into 500 ml graduated cylinders immediately after the mixing and total volume of each sample was recorded. All samples were then defoamed by adding one drop of octyl alcohol and shaking the cylinders gently. The defoamed samples were filtered through a 100 mesh screen. The residues on the screen were washed gently with about 50 ml of tap water, dried in an oven at about 200° F., and weighed. The results are shown in Table 1.

TABLE 1

Liquid Additive Compared to Dry Additive

| Sample No. | Additive (grams) | Total Vol. (ml) | Foam Vol. (ml)$^a$ | Residue on 100 Mesh Screen | |
|---|---|---|---|---|---|
| | | | | gram | Weight %$^b$ |
| Base$^c$ | — | 120 | 00 | 0.00 | 00.0 |
| 01 | Dry (2.00) | 210 | 90 | 0.31 | 15.5 |
| 02 | Liquid (6.67)$^d$ | 140 | 20 | 0.06 | 3.0 |

$^a$-Foam Vol. = Total volume minus 120 ml.
$^b$-Weight % = (grams residue/2.00) × 100.
$^c$-Base represents the screened slurry with no additive.
$^d$-The invention composition. A 6.67 gram liquid contained 2.00 grams Dry Additive.

The foam volume was much lower in the sample that contained the liquid additive (sample no. 02) than the sample containing Dry Additive (sample no. 01). Further, the residue on 100 mesh screen was much higher from the sample with Dry Additive than the invention liquid composition. These results indicate that the liquid additive of the invention is more efficient to use in fluids that are used for drilling holes in ground than the Dry Additive because the material will not be screened out by solid control equipment.

The results shown in the above examples clearly demonstrate that the present invention is well adapted to carry out the objects and attain the ends and advantages mentioned as well as those inherent therein. While modifications may be made by those skilled in the art, such modifications are encompassed within the spirit of the present invention as defined by the disclosure and the claims.

That which is claimed is:

1. A composition comprising water, a viscosifier, a polypropylene glycol polymer, and at least one sulfonated asphalt.

2. A composition according to claim 1 wherein said water is selected from the group consisting of pure water, regular tap water, a solution, a water-containing suspension, and combinations of two or more thereof.

3. A composition according to claim 2 wherein said water-containing solution and said water-containing suspension comprise a substance selected from the group consisting of salts, clays, and combinations thereof.

4. A composition according to claim 1 wherein said viscosifier is a water-soluble polymer selected from the group consisting of starches, gums, other biopolysaccharides, cellulose ethers, acrylamide-based polymers, and combinations of two or more thereof.

5. A composition according to claim 4 wherein said viscosifier is carboxymethylcellulose.

6. A composition according to claim 1 wherein said sulfonated asphalt is selected from the group consisting of sodium salt of sulfonated asphalt, potassium salt of sulfonated asphalt, and combinations thereof.

7. A composition according to claim 6 wherein said sulfonated asphalt is sodium salt of sulfonated asphalt.

8. A composition according to claim 1 wherein said sulfonated asphalt further comprises an additive selected from the group consisting of gilsonite, graphite, carbon black, lignite, neutralized lignite, sulfonated lignite, sulfo-alkylated lignite, ground asphalt, blown asphalt, and combinations of two or more thereof.

9. A composition according to claim 8 wherein said additive is lignite.

10. A composition according to claim 1 wherein the weight % of said viscosifier in said composition is in the range of from about 0.01 to about 10%.

11. A composition according to claim 10 wherein said weight % is from about 0.06 to about 5%.

12. A composition according to claim 11 wherein said weight % is from 0,1 to 3%, 13. A composition according to claim 1 wherein the weight % of said polypropylene glycol polymer in said composition is in the range of from about 0.05 to about 20%.

14. A composition according to claim 13 wherein said weight % is from about 0.1 to about 15%.

15. A composition according to claim 14 wherein said weight % is from 0.5 to 10%.

16. A composition according to claim 1 wherein the weight % of said sulfonated asphalt in said composition is in the range of from about 5 to about 60%.

17. A composition-according to claim 16 wherein said weight % is from about 10 to about 50%.

18. A composition according to claim 17 wherein said weight % is from 15 to 45%.

19. A composition comprising water, an acrylamide-containing polymer, polypropylene glycol, and sodium salt of sulfonated asphalt.

20. A composition according to claim 19 wherein the weight % of said acrylamide-containing polymer is from 0.1 to 3%; the weight % of said polypropylene glycol is from 0.5 to 10%; the weight % of said sodium salt: of sulfonated asphalt is from 15 to 45%; and water makes up the rest of said composition.

21. A composition according to claim 1 further comprising a clay.

22. A water-based fluid comprising water and a liquid composition wherein said liquid composition comprises water, a viscosifier, a polypropylene glycol polymer, and at least one sulfonated asphalt.

23. A process comprising: (1) mixing a viscosifier with water to form a viscosified water; (2) contacting a polypropylene glycol polymer with said viscosified water to form a glycol-viscosified water mixture; and (3) contacting said glycol-viscosified water mixture with at least one sulfonated asphalt.

24. A process according to claim 23 wherein said viscosifier is a water-soluble polymer selected from the group consisting of starches, gums, other biopolysaccharides, cellulose ethers, acrylamide-based polymers, and combinations of two or more thereof.

25. A process according to claim 23 wherein said sulfonated asphalt is selected from the group consisting of sodium salt of sulfonated asphalt, potassium salt of sulfonate asphalt, and combinations thereof.

26. A process according to claim 23 wherein said sulfonated asphalt further comprises an additive selected from the group consisting of gilsonite, graphite, carbon black, lignite, neutralized lignite, sulfonated lignite, ground asphalt, blown asphalt, sulfo-alkylated lignite, and combinations of two or more thereof.

27. A process for contacting a subterranean formation with a well fluid in an oil field operation wherein said well fluid comprises a clay and a composition which comprises water, a viscosifier, a polypropylene glycol polymer, and at least one sulfonated asphalt.

28. A process according to claim 23 wherein said viscosifier is carboxymethylcellulose.

29. A process according to claim 23 wherein said sulfonated asphalt is sodium salt of sulfonated asphalt.

30. A process according to claim 23 wherein said sulfonated asphalt further comprises an additive selected from the group consisting of gilsonite, graphite, carbon black, lignite, neutralized lignite, sulfonated lignite, sulfo-alkylated lignite, ground asphalt, blown asphalt, and combinations of two or more thereof.

31. A process according to claim 30 wherein said additive is lignite.

32. A process according to claim 23 wherein the weight % of said viscosifier in said composition is in the range of from about 0.01 to about 10%.

33. A process according to claim 32 wherein said weight % is from 0.1 to 3%.

34. A process according to claim 23 wherein the weight % of said polypropylene glycol polymer in said composition is in the range of from about 0.05 to about 20%.

35. A process according to claim 34 wherein said weight % is from 0.5 to 10%.

36. A process according to claim 23 wherein the weight % of said sulfonated asphalt in said composition is in the range of from about 5 to about 60%.

37. A process according to claim 36 wherein said weight % is from 15 to 45%.

38. A process according to claim 23 wherein said water further comprises a clay.

39. A process comprising the steps of: (1) combining an acrylamide-containing polymer with water to form a viscosified water; (2) combining said viscosified water with polypropylene glycol to form a glycolviscosified water mixture; and (3) combining said glycol-viscosified water with sodium salt of sulfonated asphalt to form a liquid composition wherein the weight % of said acrylamide-containing polymer in said liquid composition is from 0.1 to 3%; the weight % of said polypropylene glycol in said liquid composition is from 0.5 to 10%; the weight % of said sodium salt of sulfonated asphalt in said liquid composition is from 15 to 45%; and water makes up the rest of said liquid composition.

40. A process according to claim 27 wherein said viscosifier is carboxymethylcellulose.

41. A process according to claim 27 wherein said sulfonated asphalt is sodium salt of sulfonated asphalt.

42. A process according to claim 27 wherein said sulfonated asphalt comprises an additive selected from the group consisting of gilsonite, graphite, carbon black, lignite, neutralized lignite, sulfonated lignite, sulfo-alkylated lignite, ground asphalt, blown asphalt, and combinations of two or more thereof.

43. A process according to claim 42 wherein said additive is lignite.

44. A process according to claim 27 wherein the weight % of said viscosifier in said composition is in the range of from about 0.01 to about 10%.

45. A process according to claim 44 wherein said weight % is from 0.1 to 3%.

46. A process according to claim 27 wherein the weight % of said polypropylene glycol polymer in said composition is in the range of from about 0.05 to about 20%.

47. A process according to claim 46 wherein said weight % is from 0.5 to 10%.

48. A process according to claim 27 wherein the weight % of said sulfonated asphalt in said composition is in the range of from about 10 to about 50%.

49. A process according to claim 48 wherein said weight % is from 15 to 45%.

50. A process according to claim 27 wherein said well fluid further comprises a clay.

* * * * *